US010500486B2

(12) United States Patent
Sidwell (10) Patent No.: US 10,500,486 B2
(45) Date of Patent: Dec. 10, 2019

(54) ANALOG STICK

(71) Applicant: Dakota Sidwell, Lancaster, OH (US)

(72) Inventor: Dakota Sidwell, Lancaster, OH (US)

( * ) Notice: Subject to any disclaimer, the term of this patent is extended or adjusted under 35 U.S.C. 154(b) by 384 days.

(21) Appl. No.: 15/087,465

(22) Filed: Mar. 31, 2016

(65) Prior Publication Data

US 2016/0287986 A1 Oct. 6, 2016

Related U.S. Application Data

(60) Provisional application No. 62/140,535, filed on Mar. 31, 2015.

(51) Int. Cl.
*A63F 13/24* (2014.01)
(52) U.S. Cl.
CPC ............................ *A63F 13/24* (2014.09)
(58) Field of Classification Search
CPC ........................................... A63F 13/24
USPC .................................. 345/156–184
See application file for complete search history.

(56) References Cited

U.S. PATENT DOCUMENTS

| | | | | |
|---|---|---|---|---|
| 5,959,613 A | * | 9/1999 | Rosenberg | A63F 13/06 341/20 |
| 7,061,720 B2 | * | 6/2006 | Lin | G11B 19/022 345/184 |
| 9,710,072 B1 | * | 7/2017 | Strahle | G06F 3/033 |

* cited by examiner

*Primary Examiner* — David L Lewis
*Assistant Examiner* — Yingchuan Zhang
(74) *Attorney, Agent, or Firm* — Dunham IP Law LLC (57) ABSTRACT

The exemplary embodiments provide an analog stick for use with an electronic controller. The analog stick preferably includes a top construct having a downward-facing substantially flat surface and a bottom construct which attaches to the top construct and contains an upward-facing substantially flat surface. A bearing is preferably positioned between the upward-facing surface and downward-facing surface. The top and bottom constructs can be attached using a number of different methods. Preferably, the bearing surrounds a portion of both the top and bottom constructs.

19 Claims, 7 Drawing Sheets

＃ ANALOG STICK

CROSS-REFERENCE TO RELATED APPLICATIONS

This application claims priority to U.S. Provisional Application No. 62/140,535 filed on Mar. 31, 2015 which is herein incorporated by reference in its entirety.

TECHNICAL FIELD

Embodiments generally relate to analog sticks for electronic controls.

BACKGROUND OF THE ART

Analog sticks are generally used in electronic controllers for two-dimensional input based on the position of a protrusion in relation to the default "center" position.

SUMMARY OF THE EXEMPLARY EMBODIMENTS

Exemplary embodiments provide an analog stick having a top construct which is attached to the bottom construct. In some embodiments the two constructs may be attached using snap fitting or through a surface to surface bonding technique. Preferred embodiments place a bearing in between the top and bottom constructs. Some embodiments also utilize an optional center dowel pin which preferably passes through both the top and bottom constructs. The exemplary embodiments of the analog stick herein could be used with various types of electronic controls, including but not limited to video game controllers, machine controllers, user interfaces (of various types), and any other electronic controller that requires human input.

The foregoing and other features and advantages of the present invention will be apparent from the following more detailed description of the particular embodiments, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which.

DETAILED DESCRIPTION

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
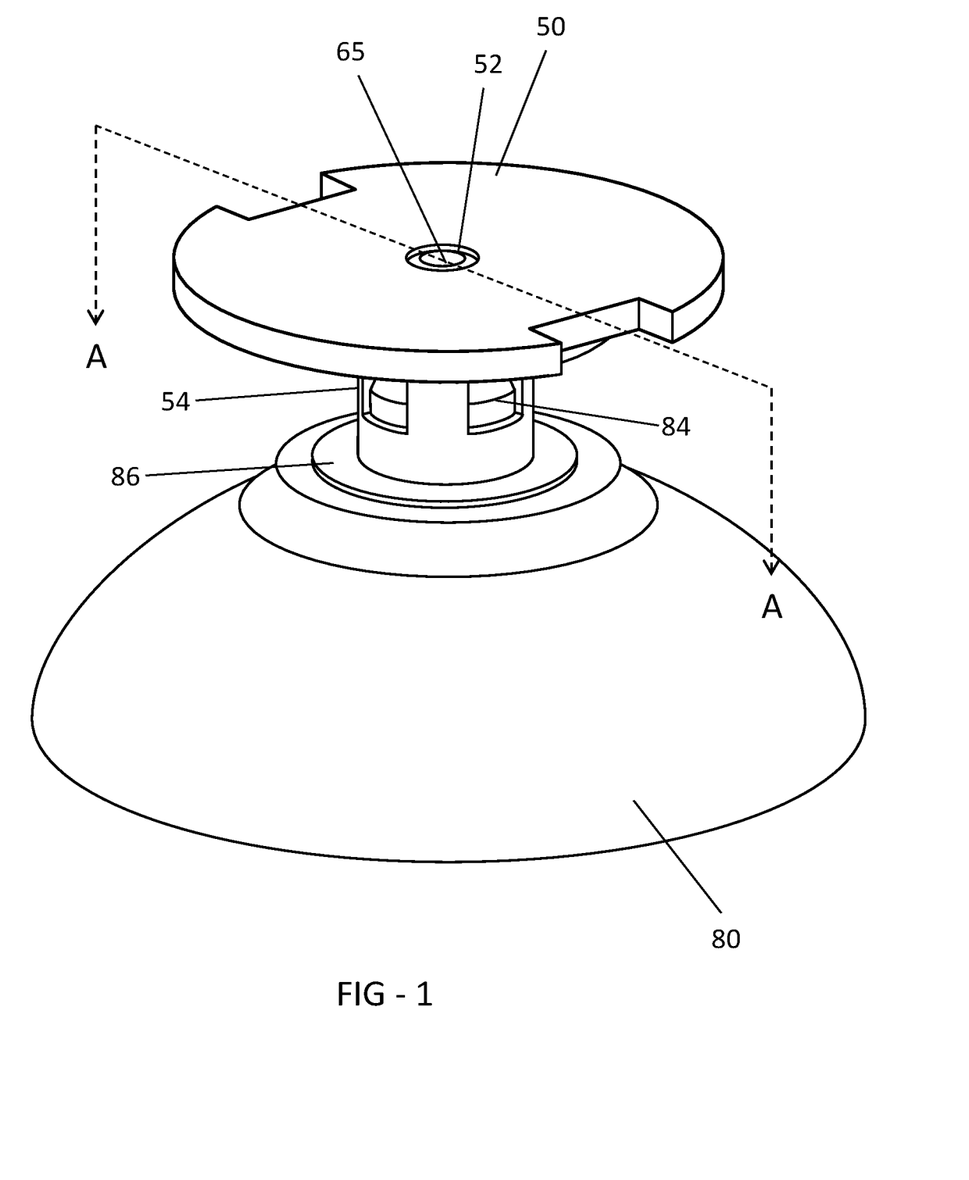
FIG. 1 is a front perspective view of a first embodiment of the analog stick and indicating the section line A-A.

FIG. 1 is a front perspective view of a first embodiment of the analog stick and indicating the section line A-A. In this embodiment, a top construct 50 is preferably snapped onto the bottom construct 80. A series of voids 54 are preferably positioned around the perimeter of the top construct 50. The voids 54 are preferably sized and positioned to accept the tabs 84 which protrude upwardly from the bottom construct 80. Moving outwardly from the tabs 84, a first substantially flat annular surface 86 is placed around the tabs 84 and is substantially perpendicular to the tabs 84. This surface 86 is preferably upward-facing and can accept an optional bearing (described further below). An optional center dowel pin 65 may be inserted into a center void 52 in the top construct 50.

Figure 2:
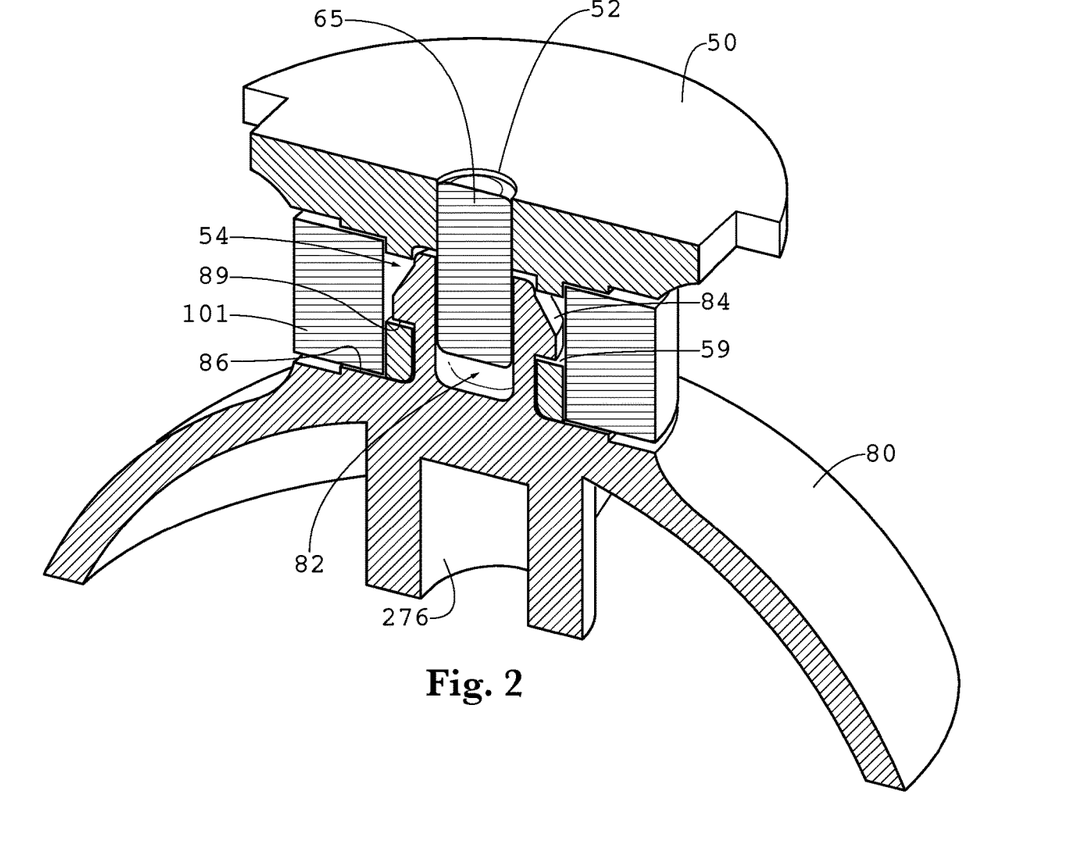
FIG. 2 is a perspective section view of the embodiment shown in FIG. 1 taken along the section line A-A.

FIG. 2 is a perspective section view of the embodiment shown in FIG. 1 taken along the section line A-A. As shown, the tabs 84 preferably contain a bottom substantially flat surface 89 which overlaps another substantially flat surface 59 partially defining the void 54 in the top construct 50 so that the tab 84 cannot be removed from the void 54 once these surfaces 59/89 overlap or become adjacent to one another. A center void 82 is preferably placed within the bottom construct 80 and is preferably aligned with the central axis of the void 52 in the top construct 50. Preferably, the center void 82 is at least partially defined as the space between the tabs 84. The optional center dowel pin 65 is preferably inserted so that it passes through both voids 52 and 82. The dowel pin 65 may be inserted before or after placing the top construct 50 on the bottom construct 80. A pole recess 276 is preferably placed on the underside of the bottom construct 80 and is sized to accept the pole 250 of a microcontroller (discussed further below).

Figure 3:
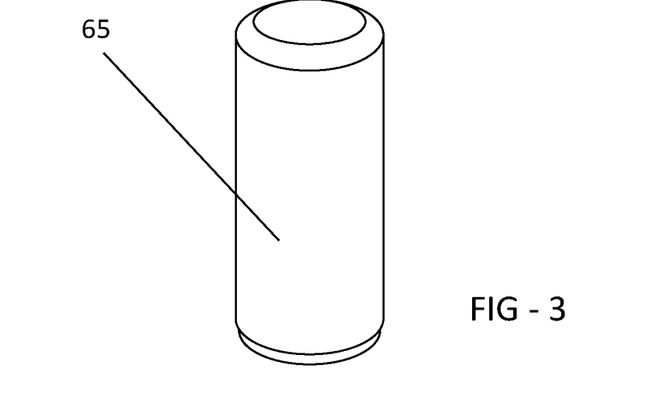
FIG. 3 is a front perspective view of an embodiment of the optional center dowel pin.

FIG. 3 is a front perspective view of an embodiment of the optional center dowel pin 65.

Figure 4:
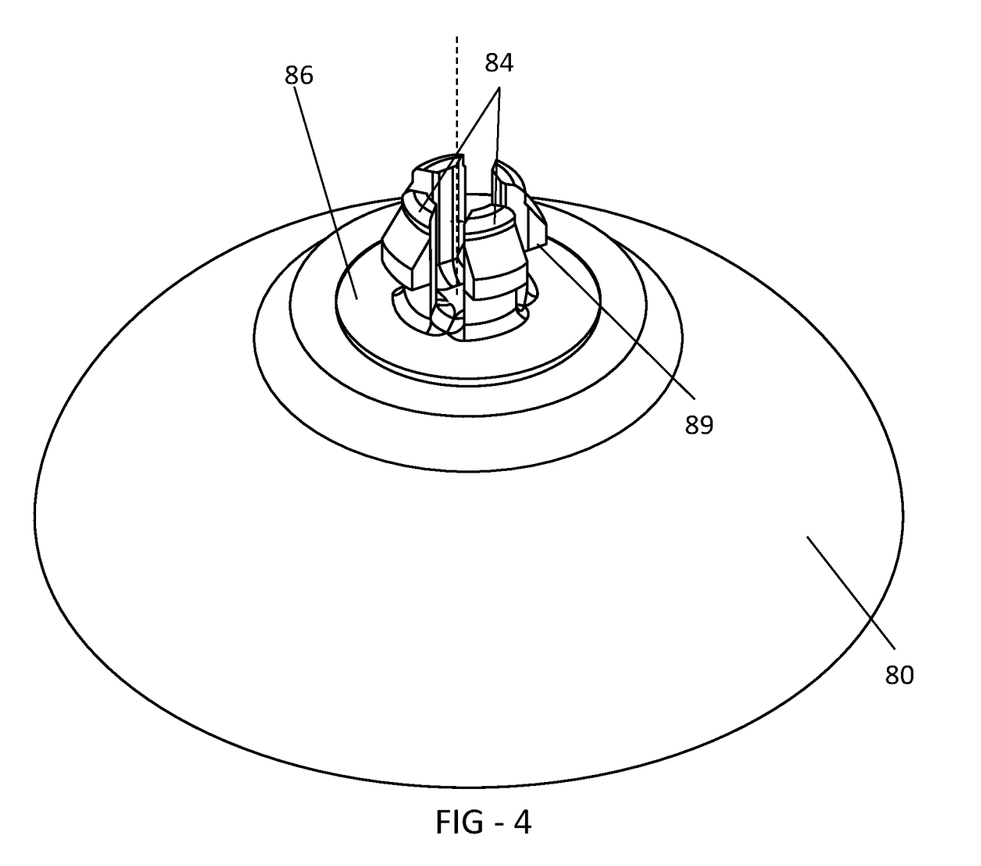
FIG. 4 is a top perspective view of the bottom construct.

FIG. 4 is a top perspective view of the bottom construct 80 showing the tabs 84 extending from the top surface 86, which is preferably substantially planar. Although shown with four tabs 84, this is not required as any number of tabs (equal or greater than two) could be used with various embodiments of the invention. Preferably there is spacing in between each tab 84 and each tab 84 has a substantially flat surface 89 that extends outwardly from the central axis of the bottom construct 80. Preferably, the tabs 84 are spaced equidistantly around the central axis where there is an equal amount of space between each tab, but this is not required.

Figure 5:
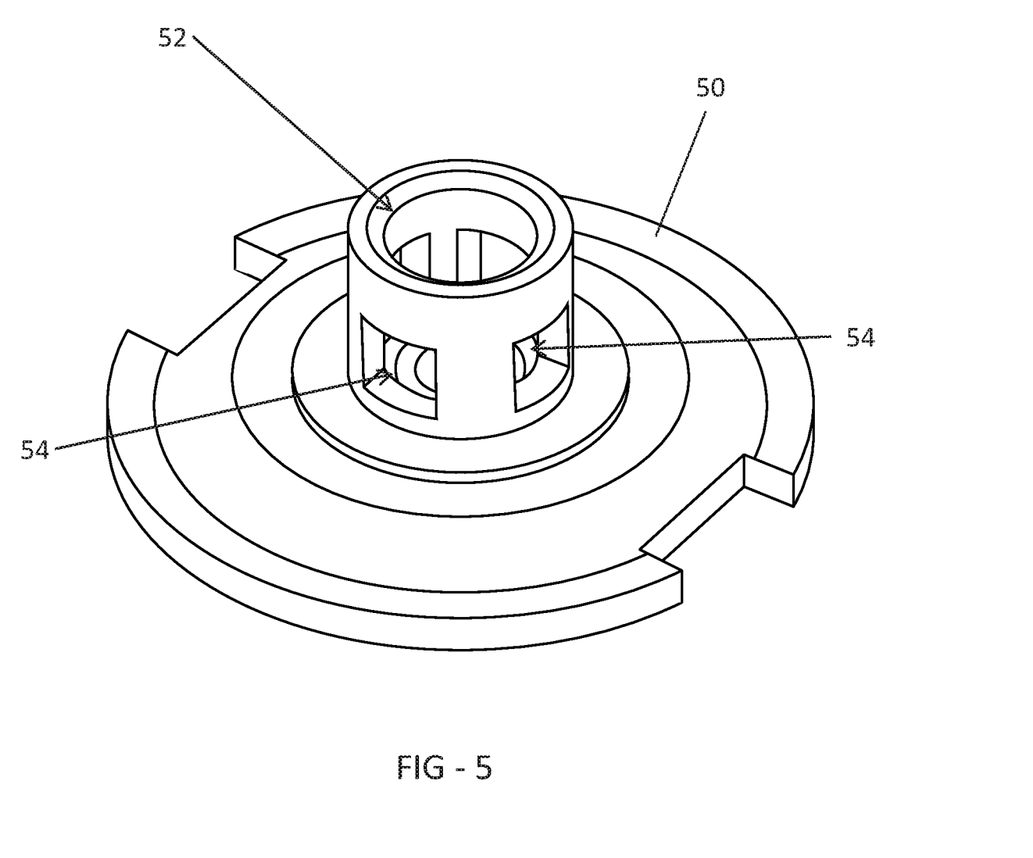
FIG. 5 is a bottom perspective view of the top construct.

FIG. 5 is a bottom perspective view of the top construct 50. In this embodiment, the voids 54 have a rectangular shape and in some embodiments a square shape. The center void 52 preferably passes through the entire top construct 50 although it may not have the same dimensions throughout the device (i.e. the diameter may get larger or smaller depending on where on the top construct the void 52), depending on the application.

Figure 6:
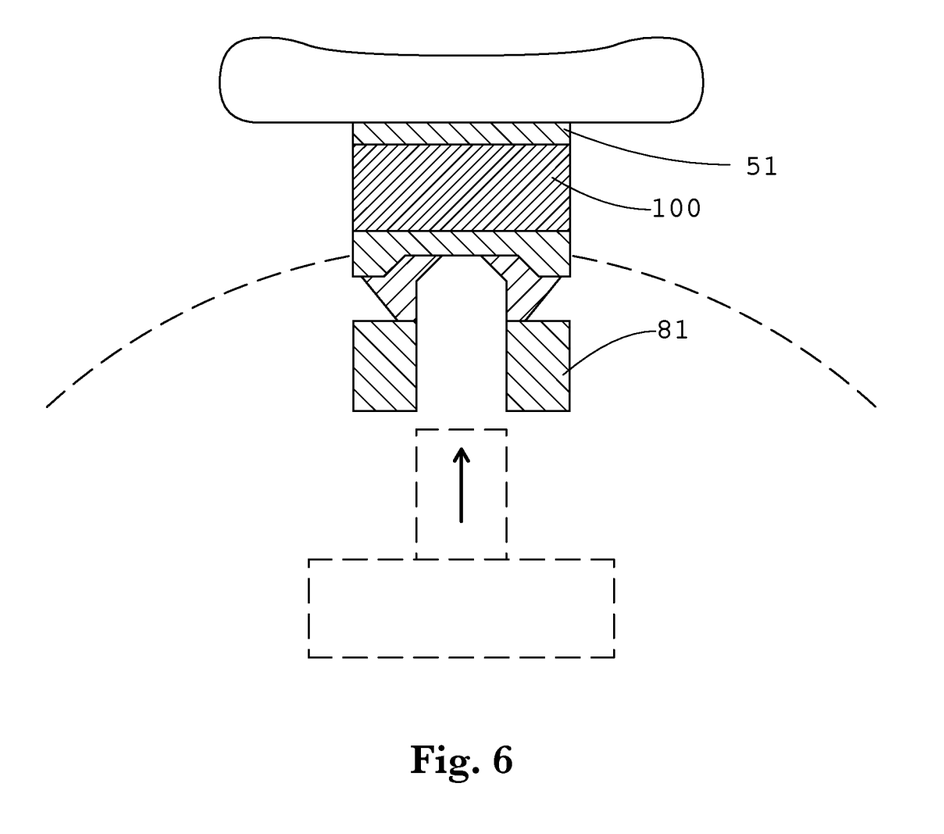
FIG. 6 is a section view of a second embodiment of the analog stick and showing the preferred placement of a bearing.

FIG. 6 is a section view of a second embodiment of the analog stick and showing the preferred placement of a bearing 100. In this embodiment, the bearing 100 is preferably sandwiched in between the top construct 51 and the bottom construct 81.

Figure 7:
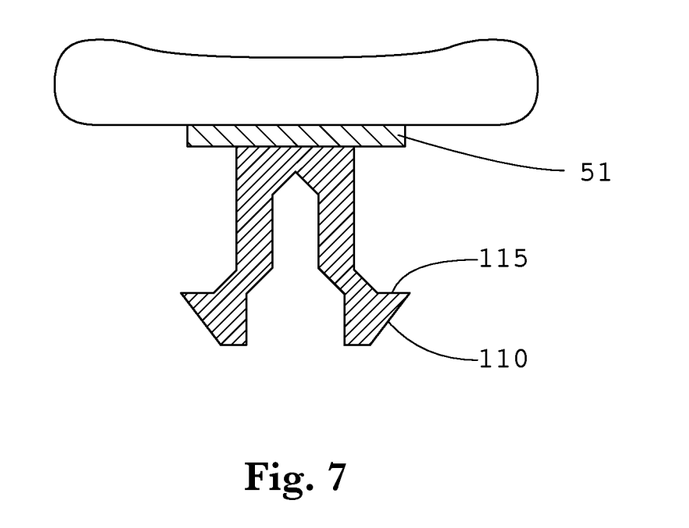
FIG. 7 is a partial section view of the top construct of the second embodiment.

FIG. 7 is a partial section view of the top construct 51 of the second embodiment. As shown, in this embodiment the tabs 110 extend downwardly from the top construct 51. Each tab contains a substantially flat surface 115, but in contrast to the surface 89 described above, this surface faces upwardly towards the top of the device when assembled.

Figure 8:
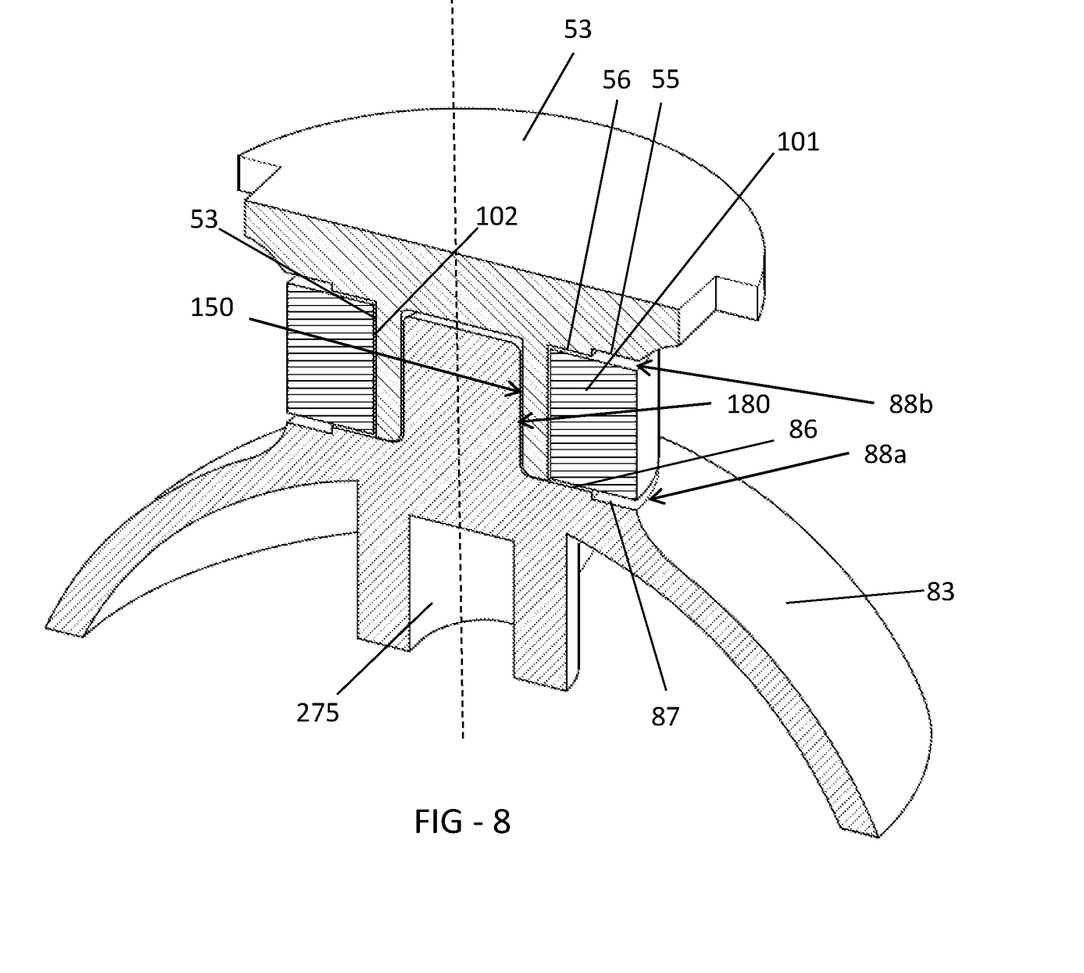
FIG. 8 is a perspective section view of a third embodiment of the analog stick.

FIG. 8 is a perspective section view of a third embodiment of the analog stick. Here, the top construct 53 may be attached to the bottom construct 83 by attaching surface 150 to surface 180 through a surface to surface type of bonding technique. In an exemplary embodiment the surfaces 150/180 would be bonded using some type of welding operation, preferably ultrasonic welding. However, in some embodiments the surfaces 150/180 may be bonded using heat fusion, friction welding, or spin welding as well. In some embodiments, the surfaces 150/180 would be bonded together using adhesive. In some embodiments, the top construct 53 contains a first set of threads, while the bottom construct 83 contains a corresponding second set of threads. In this way, the top construct 53 can be threaded onto the bottom construct 83, or vice versa. In some embodiments, the upper portion of the bottom construct 53 would contain male threads while the lower portion of the top construct 53 would contain mating female threads, or these can be reversed. A pole recess 275 is preferably placed on the underside of the bottom construct 83 and is sized to accept the pole 250 of a microcontroller (discussed further below).

An exemplary version of this embodiment of the analog stick would not include the optional center dowel pin, although it could be used if desired. The bearing 101 preferably sets atop the substantially flat surface 86 and surrounds a lower cylindrical portion of the top construct 53. The surface 180 is provided as the outer surface of an upper cylindrical portion of the bottom construct 83. These two cylindrical portions could be reversed though, where the upper cylindrical portion of the bottom construct 83 is placed outside of the lower cylindrical portion of the top construct 53 such that the bearing would surround the upper cylindrical portion of the bottom construct 83. In this way, for the embodiment shown, the bearing 101 contains an interior surface 102 which is adjacent to an exterior surface 58 of the lower cylindrical portion of the top construct 53. As described above however, in other embodiments these can be reversed, where the bearing 101 contains an interior surface 102 which is adjacent to an exterior surface of the upper cylindrical portion of the bottom construct 83.

The underside of the top construct 53 preferably contains a substantially flat downward-facing surface 56 which has a similar area and shape as the surface 86 of the bottom construct 83. Preferably, the two surfaces 56 and 83 are aligned with one another and/or located at the same radial and/or horizontal distance from the vertical centerline of the analog stick. In some embodiments, the bearing 101 is sandwiched between surfaces 56 and 83. In other embodiments, the bearing 101 rests atop surface 86, but there remains a small clearance between the top surface of the bearing 101 and the surface 56.

A second substantially flat surface 87 preferably extends radially from the surface 86 and is also positioned slightly lower than surface 86. A gap 88a is preferably defined by the spacing between the bottom surface of the bearing 101 and the surface 87. Similarly, a second gap 88b is preferably defined by the spacing between the top surface of the bearing 101 and the bottom outer surface 55 of the top construct 53. As shown, the surface 55 preferably extends radially from the downward-facing surface 56 and is preferably positioned at a vertical height that is above a vertical height for the downward-facing surface 56. Preferably, the gaps 88a and 88b have similar dimensions, but this is not required. The bearing 101 preferably extends outwardly until it meets the outer edge of the surface 87, right at the point where the bottom construct 83 begins to slope downwardly in a dome-like shape.

Figure 9A:
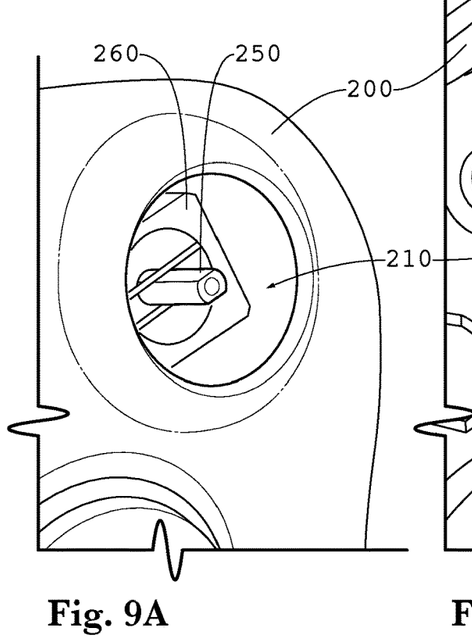
FIG. 9A is a partial front perspective view of a controller housing and showing the socket containing the microcontroller.
Figure 9B:
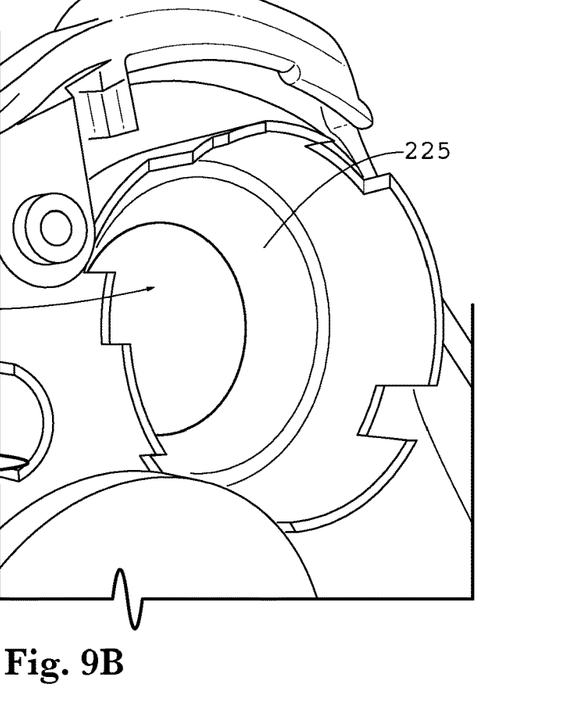
FIG. 9B is a partial rear perspective view of a controller housing showing the rear side of the socket and internal surfaces.
Figure 9C:
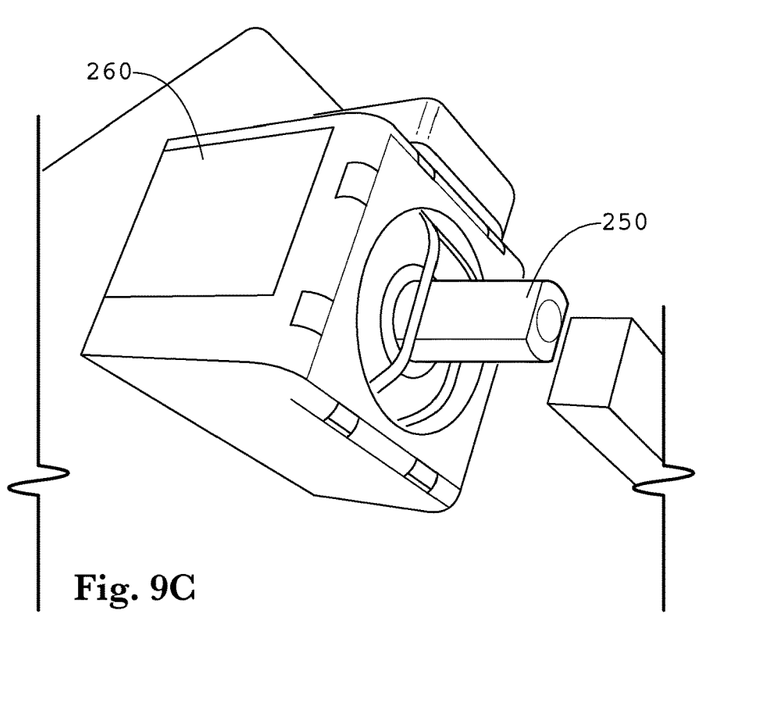
FIG. 9C is a perspective view of an exemplary microcontroller and pole.

FIG. 9A is a partial front perspective view of a controller housing 200 and showing the socket 210 containing the micro-controller 260. FIG. 9B is a partial rear perspective view of a controller housing 200 showing the rear side of the socket 210 and internal surfaces 225 where the micro-controller 260 has been removed for clarity. FIG. 9C is a perspective view of an exemplary micro-controller 260 and pole 250.

As noted above, the pole recesses 275 and 276 are preferably sized to accept the pole 250 extending from the micro-controller 260. The pole 250 can have a rectangular or a cylindrical/circular cross-section and the pole recesses 275 and 276 should preferably contain a corresponding cross-section. In some embodiments, as shown here, the pole 250 contains a generally rectangular cross-section, while also having some rounded edges, and an exemplary embodiment of the recesses 275 and 276 would be designed to correspond substantially so that the pole 250 could be easily inserted, but would not substantially rotate about the vertical central axis once inserted.

As shown herein, the bearings 100/101 could be any form of radial bearing but would preferably be sealed bearings to prevent dust and dirt from affecting the performance of the bearing. The bearings 100/101 are preferably sealed radial ball bearings or deep groove rubber shielded ball bearings, but other types of bearings can work with various embodiments of the invention. Generally speaking, the bearings 101/101 should be positioned within the socket 210 so that the outer surfaces of the bearings 101/100 would contact the internal surfaces 225 of the socket 210 within the controller housing 200.

Each of the embodiments of the bottom constructs taught herein, as shown in the figures, preferably includes a dome-like portion at the bottom, ceasing in a circular edge such that the analog stick could rest upon said circular edge. In some embodiments, as shown in the figures, the bottom construct may have a lower portion shaped substantially like a hemisphere. The exemplary embodiments of the analog stick herein could be used with various types of electronic controls, including but not limited to video game controllers, machine controllers, user interfaces (of various types), and any other electronic controller that requires human input. Generally speaking, these controls contain a socket that would accept (at least partially) the dome-shaped lower portion of the bottom constructs shown and described herein. In each embodiment, as shown above, the top and bottom constructs are substantially symmetrical about a vertical centerline.

Having shown and described preferred embodiments of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

I claim:

1. An analog stick comprising:
a top construct having a downward-facing substantially flat surface;
a bottom construct which attaches to the top construct and contains an upward-facing substantially flat surface and a dome shape which extends downwardly and is positioned below the upward-facing substantially flat surface; and
a bearing positioned between the upward-facing surface and downward-facing surface.

2. The analog stick of claim 1 wherein:
the bearing surrounds a portion of both the top construct and the bottom construct.

3. The analog stick of claim 1 wherein:
the top construct and bottom construct snap together.

4. The analog stick of claim 1 wherein:
the upward-facing surface is annular.

5. The analog stick of claim 1 wherein:
the upward-facing surface and the downward-facing surface are aligned with one another.

6. The analog stick of claim 1 wherein:
the upward-facing surface and the downward-facing surface each begin and end at substantially the same horizontal distance from a vertical centerline of the analog stick.

7. The analog stick of claim 1 wherein:
the bearing is a sealed radial bearing.

8. The analog stick of claim 1 wherein:
the bearing rests atop the upward-facing surface on the bottom construct.

9. The analog stick of claim 1 further comprising:
a second upward-facing surface extending radially from the upward-facing surface on the bottom construct; and
a second downward-facing surface extending radially from the top construct.

10. The analog stick of claim 1 wherein:
the bearing contains an inner surface that is adjacent to a surface of the top construct.

11. An analog stick comprising:
a top construct having a downward-facing substantially flat surface and a lower cylindrical portion;
a bottom construct having an upward-facing substantially flat surface and an upper cylindrical portion attached to the lower cylindrical portion of the top construct;
a dome portion on the bottom construct which is positioned below the upward-facing substantially flat surface; and
a bearing positioned between the upward-facing surface and downward-facing surface.

12. The analog stick of claim 11 wherein:
the bearing contains an interior surface which is adjacent to the lower cylindrical portion of the top construct.

13. The analog stick of claim 11 wherein:
the bearing surrounds a portion of the top construct.

14. The analog stick of claim 11 wherein:
the upward-facing surface and downward-facing surface each extend radially at substantially the same distance from a vertical centerline of the analog stick.

15. The analog stick of claim 11 wherein:
a second upward-facing surface extending radially from the upward-facing surface on the bottom construct and located at a lower vertical height.

16. The analog stick of claim 11 wherein:
a perimeter of the second upward-facing surface transitions to a hemispherical shape which forms a bottom portion of the bottom construct.

17. An analog stick comprising:
a top construct having a first downward-facing surface, a second downward-facing surface extending radially from the first downward-facing surface and positioned at a vertical height that is above a vertical height for the first downward-facing surface;
a bottom construct attached to the top construct and having a first upward-facing surface, a second upward-facing surface extending radially from and fully encircling the first upward-facing surface and positioned below the first upward-facing surface; and
a bearing resting atop the first upward-facing surface.

18. The analog stick of claim 17 wherein:
the bearing extends radially to an outer edge of the second upward-facing surface.

19. The analog stick of claim 18 wherein:
the bearing extends radially until the second upward-facing surface transitions into a hemispherical surface on the bottom construct.

* * * * *